United States Patent
Hsin et al.

(10) Patent No.: US 9,683,834 B2
(45) Date of Patent: Jun. 20, 2017

(54) ADAPTABLE DEPTH SENSING SYSTEM

(71) Applicant: Intel Corporation, Santa Clara, CA (US)

(72) Inventors: Chih-Fan Hsin, Portland, OR (US); Prasanna Krishnaswamy, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/722,955

(22) Filed: May 27, 2015

(65) Prior Publication Data

US 2016/0349042 A1   Dec. 1, 2016

(51) Int. Cl.
  *G01B 11/22* (2006.01)
  *H04N 13/02* (2006.01)
  *H04N 13/00* (2006.01)

(52) U.S. Cl.
  CPC ......... *G01B 11/22* (2013.01); *H04N 13/0022* (2013.01); *H04N 13/0271* (2013.01)

(58) Field of Classification Search
  CPC ............. H04N 5/2256; H04N 13/0022; H04N 13/0271; H04N 13/0018; H04N 13/0282; H04N 13/0495; H04N 2013/0096; H04N 21/4781; H04N 5/2226; H04N 5/23245; H04N 5/332; G01B 11/026; G01B 11/22
  (Continued)

(56) References Cited

U.S. PATENT DOCUMENTS

| | | | |
|---|---|---|---|
| 9,084,002 B2 * | 7/2015 | Tardif | ..................... G06F 3/011 |
| 2011/0025689 A1* | 2/2011 | Perez | ..................... A63F 13/06 345/420 |

(Continued)

FOREIGN PATENT DOCUMENTS

KR   1020110003891   1/2011

OTHER PUBLICATIONS

Martinello, et al., "Dual Aperture Photography: Image and Depth from a Mobile Camera," Dual Aperture International, Silicon File Technologies, Inc. and SK Hynix, Inc., ICCP 2015, 10 pages.

(Continued)

*Primary Examiner* — Mark R Gaworecki
(74) *Attorney, Agent, or Firm* — Grossman, Tucker, Perreault & Pfleger, PLLC

(57) ABSTRACT

The present disclosure is directed to an adaptable depth sensing (DS) system. A DS device may comprise a DS equipment module and a control module. The control module may configure the operational mode of the DS equipment module for close-range sensing, mid-range sensing or long-range sensing. The control module may receive at least depth data from the DS equipment module for determining the mode of operation. The control module may also receive condition data regarding the DS device and/or a host device to which the DS device is coupled, determine a configuration based on the condition data, and may utilize the condition data along with the depth data to configure the DS equipment module. Configuring the DS equipment module may comprise, for example, enabling components within the DS equipment module, configuring focus for the components, configuring image orientation for the components and/or selecting a DS methodology for the components.

23 Claims, 9 Drawing Sheets

(58) Field of Classification Search
USPC .................................................. 250/341.1
See application file for complete search history.

(56) References Cited

U.S. PATENT DOCUMENTS

| | | | | |
|---|---|---|---|---|
| 2011/0080290 A1* | 4/2011 | Baxi | ..................... | A61B 5/1116 340/573.1 |
| 2011/0228976 A1* | 9/2011 | Fitzgibbon | ......... | G06K 9/00335 382/103 |
| 2011/0317005 A1* | 12/2011 | Atkinson | .............. | G01S 17/023 348/135 |
| 2012/0056982 A1* | 3/2012 | Katz | .................... | H04N 13/025 348/43 |
| 2012/0119987 A1* | 5/2012 | Im | .......................... | G06F 3/017 345/156 |
| 2013/0050425 A1* | 2/2013 | Im | ..................... | H04N 13/0207 348/46 |
| 2013/0083184 A1* | 4/2013 | Yogesan | .............. | A61B 3/0033 348/78 |
| 2013/0095920 A1* | 4/2013 | Patiejunas | ............ | G06T 15/00 463/31 |
| 2013/0136176 A1* | 5/2013 | Chen | ................. | H04N 13/0003 375/240.12 |
| 2014/0055353 A1* | 2/2014 | Takahama | ............... | G06F 3/012 345/156 |
| 2014/0111423 A1* | 4/2014 | Park | ....................... | G06F 3/011 345/156 |
| 2014/0204179 A1* | 7/2014 | Atkinson | .............. | G01S 17/023 348/46 |
| 2014/0250245 A1* | 9/2014 | Pahud | ................... | G06F 13/102 710/14 |
| 2014/0267617 A1 | 9/2014 | Krig | | |
| 2014/0307058 A1* | 10/2014 | Kirk | ........................ | H04N 5/33 348/47 |
| 2014/0307126 A1 | 10/2014 | Son et al. | | |
| 2015/0054974 A1* | 2/2015 | Ehmann | ............... | H04N 5/2226 348/218.1 |
| 2015/0077517 A1* | 3/2015 | Powers | ................ | H04N 5/2253 348/46 |
| 2016/0088206 A1 | 3/2016 | Robinson et al. | | |

OTHER PUBLICATIONS

Martinello, et al., "Supplementary Material, Dual Aperture Photography: Image and Depth from a Mobile Camera," Dual Aperture International Silicon File Technologies, Inc. and SK Hynix, Inc., ICCP 2015, 3 pages.

International Search Report and Written Opinion from related application PCT/US2016/029511 mailed Aug. 9, 2016.

\* cited by examiner

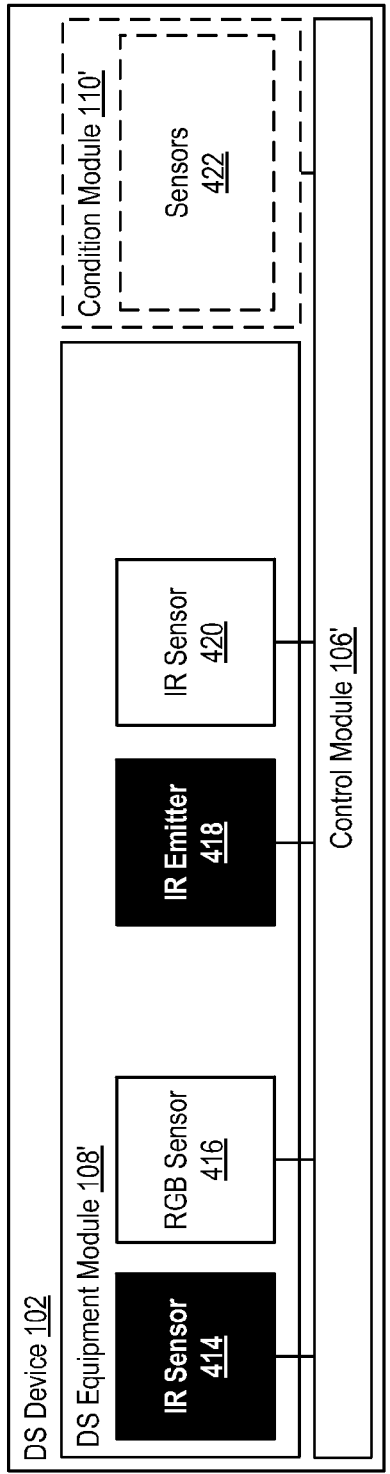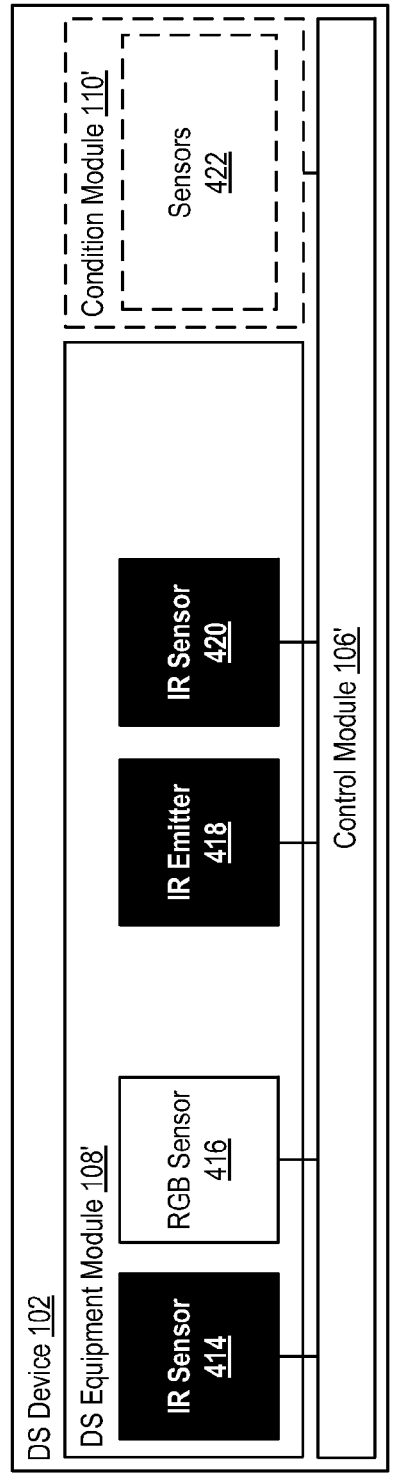

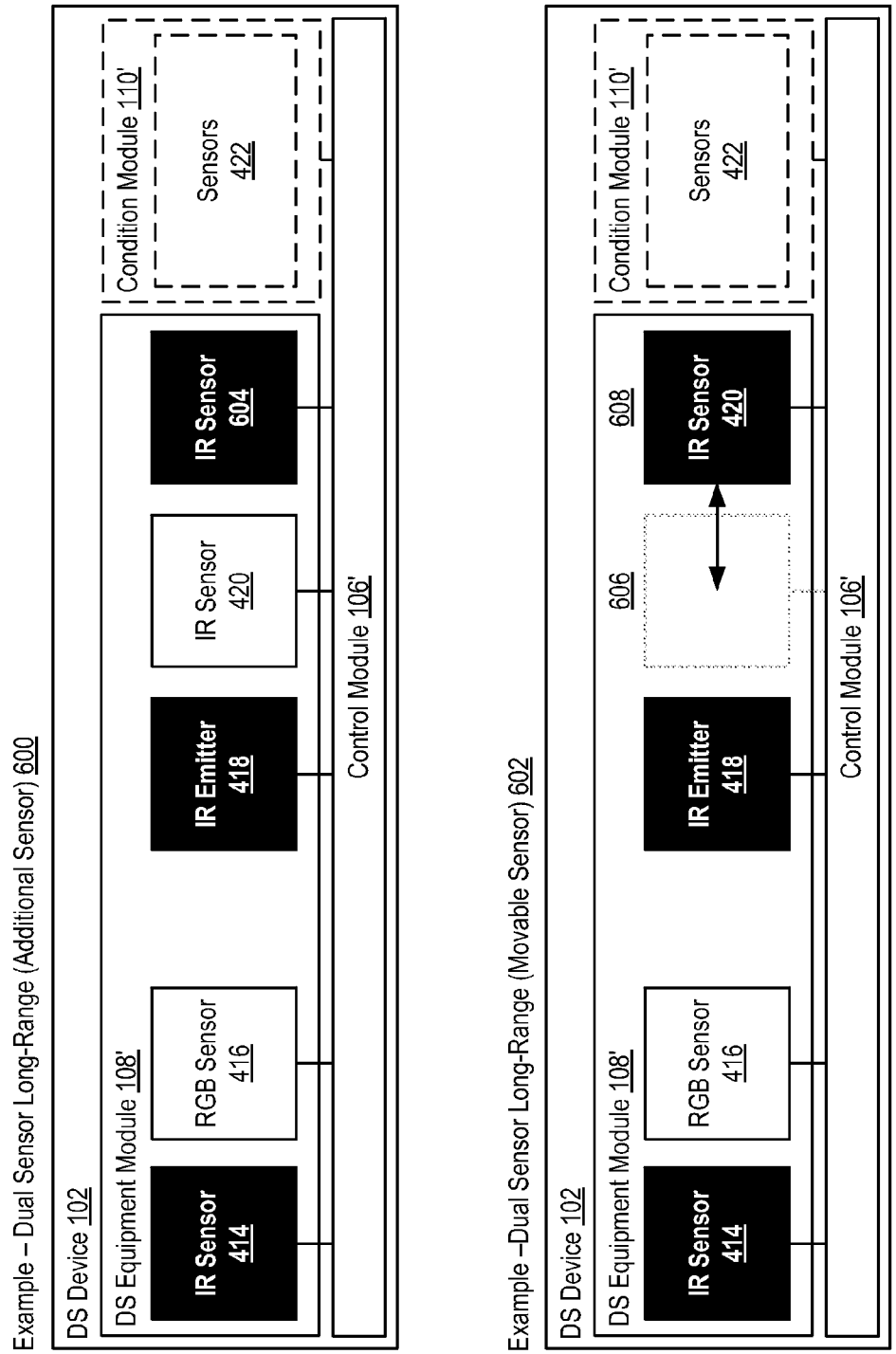

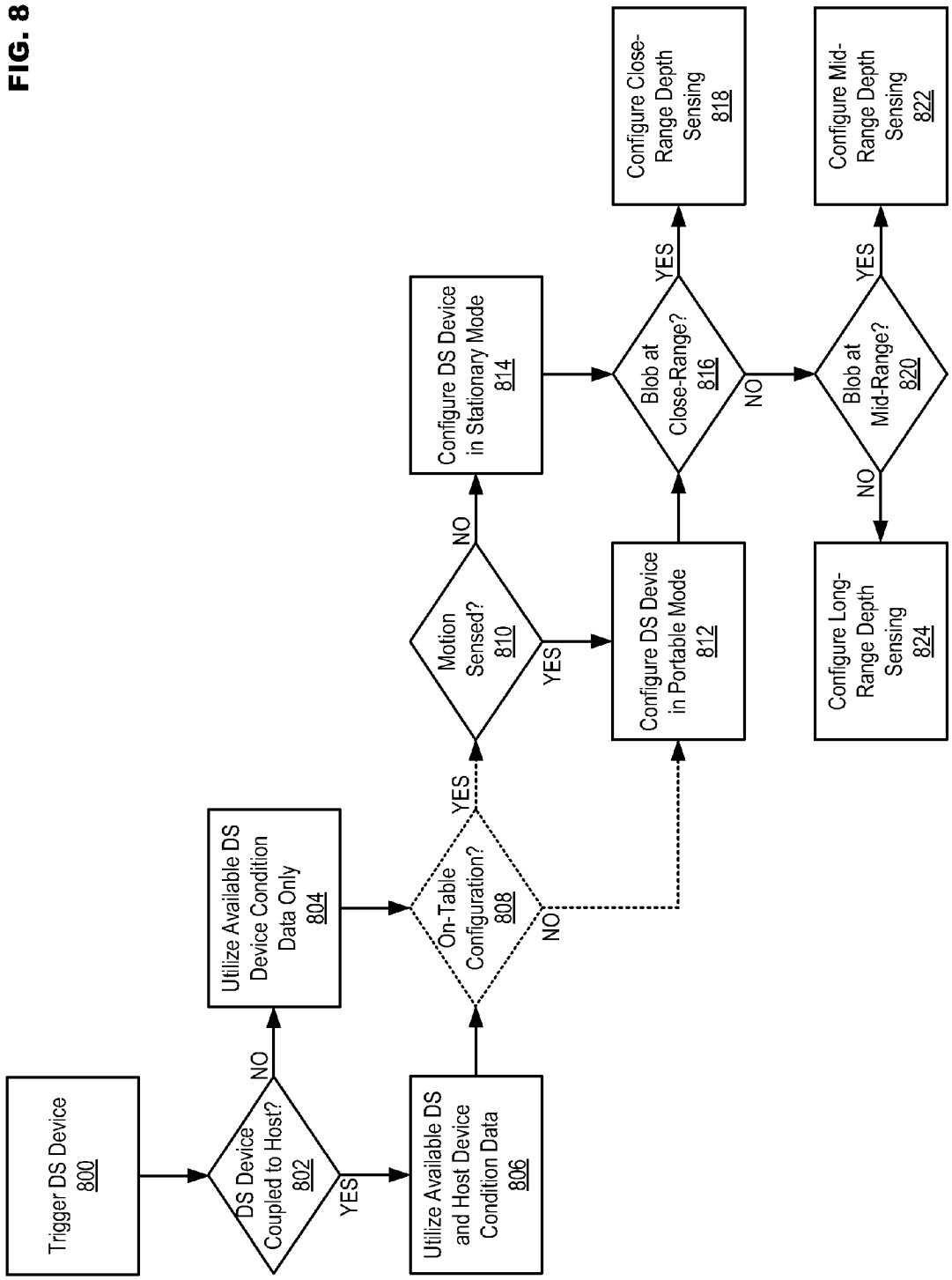

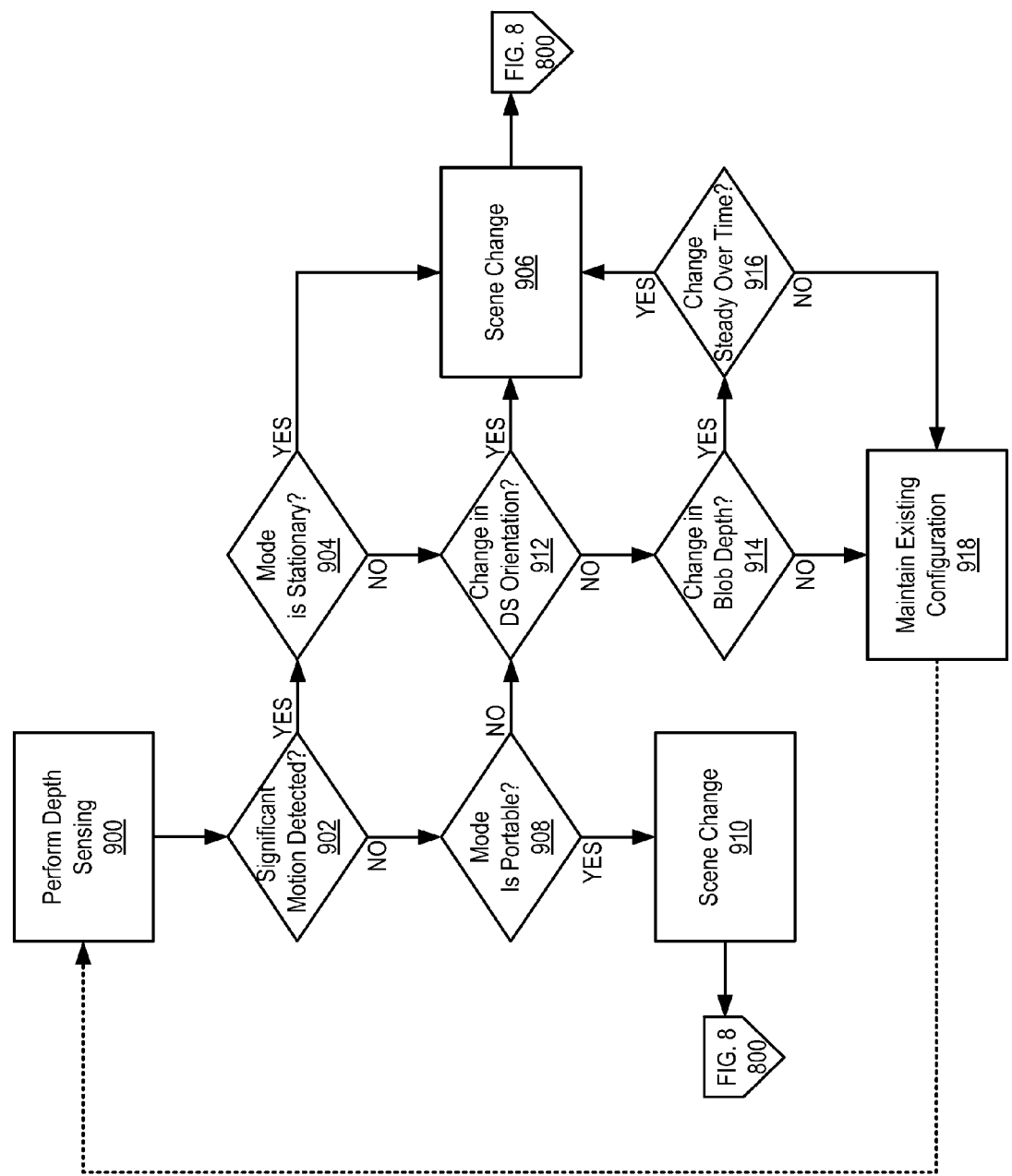

ADAPTABLE DEPTH SENSING SYSTEM

TECHNICAL FIELD

The present disclosure relates to device sensing systems, and more particularly, to a depth sensor adaptable to different sensing ranges and a system to control the adaptable depth sensor.

BACKGROUND

The manner in which users may interact with electronic devices is evolving based on new developments in sensing technology. For example, depth sensors are becoming more prevalent for specific sensing applications. Depth sensors may be capable of sensing a distance to a target from a device, and along these lines to sense gestures and/or motions made in three dimensions, etc. A common use for depth sensing is in specialized user interfaces for video games. Depth-based user interfaces may sense position, motion and/or gestures made by a game-player. The video game system may then translate the sensed depth information into inputs for controlling a character in a video game, etc. Other examples of applications that may employ depth sensing include, but are not limited to, user interface inputs to a computer (e.g., to manipulate a pointing device in a manner similar to a mouse), facial identification, facial feature tracking for mapping movement to an avatar, object targeting, manipulation, etc. for various robotics applications, etc.

While depth sensors may be designed for any one of the above example applications, it is much more difficult to design a sensor generally applicable to a variety of applications. At least one challenge when contemplating a "general-purpose" depth sensor is that close-range sensing (e.g., within one meter), mid-range sensing (e.g., between one to three meters) and long range sensing (e.g., over three meters) all comprise different equipment configurations. In particular, an example depth sensor may include at least one red, green and blue (RGB) sensor (e.g., at least two RGB sensors may be used to visually determine depth). For infrared (IR) depth sensing, the example depth sensor may also include at least one IR emitter and at least one IR receiver. The arrangement of these components within the depth sensor, the focusing of the components, the configuration of the components for operation based on different depth-sensing methodologies, etc. may vary depending on various factors such as, for example, the targeted sensing depth, the environment in which depth sensing is occurring, the amount of motion expected with respect to either the target object to be sensed or the depth sensor itself, the depth-sensing application, etc.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

FIG. 5 illustrates example configurations for single sensor close-range sensing and dual sensor mid-range sensing in accordance with at least one embodiment of the present disclosure;

FIG. 6 illustrates example configurations for dual far-range sensing utilizing an additional sensor or a movable sensor in accordance with at least one embodiment of the present disclosure;

FIG. 8 illustrates example operations for configuring an adaptable depth sensor system in accordance with at least one embodiment of the present disclosure; and FIG. 9 illustrates example operations for detecting a scene change for an adaptable depth sensor system in accordance with at least one embodiment of the present disclosure.

Figure 1:
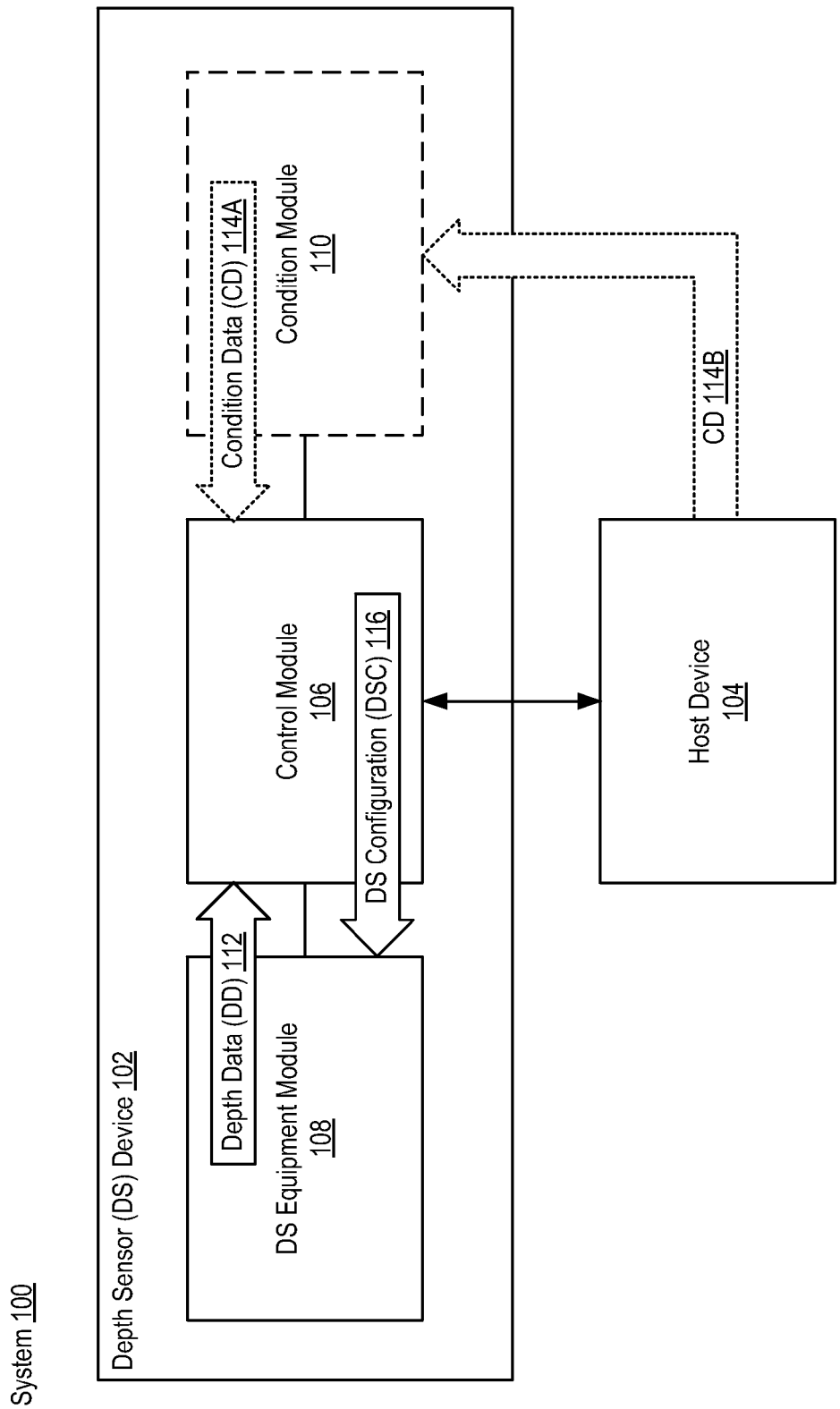
FIG. 1 illustrates an example adaptable depth sensing system in accordance with at least one embodiment of the present disclosure.

Although the following Detailed Description will proceed with reference being made to illustrative embodiments, many alternatives, modifications and variations thereof will be apparent to those skilled in the art.

DETAILED DESCRIPTION

The present disclosure is directed to an adaptable depth sensing (DS) system. In at least one embodiment, a DS device may comprise a DS equipment module and a control module. The control module may configure the operational mode of the DS equipment module for close-range sensing, mid-range sensing or long-range sensing. For example, the control module may receive at least depth data from the DS equipment module for determining the mode of operation. In at least one embodiment, the control module may further receive condition data regarding the DS device and/or a host device to which the DS device is coupled, determine a configuration based on the condition data, and may utilize the condition data along with the depth data to configure the DS equipment module. Configuring the DS equipment module may comprise, for example, enabling components in the DS equipment module, configuring focus for components in the DS equipment module, configuring image orientation for components in the DS module and/or selecting a DS methodology for components in the DS equipment module. For example, one IR sensors may be enabled for close-range sensing, while two IR sensors may be enabled for mid-range sensing. The DS equipment module may also include a third IR sensor that is activated specifically for long-range sensing, or for at least one of the IR sensors to be movable based on whether a mid-range or long-range sensing mode is configured in the DS equipment module.

In at least one embodiment, an example DS device may comprise at least a DS equipment module and a control module. The DS equipment module may be to perform DS. The control module may be to receive at least depth data from the DS equipment module and configure a mode of operation for the depth sensor equipment module based at least on the depth data.

For example, the depth data may comprise at least one of a distance from the depth sensing device to at least one pixel in a group of connected pixels sensed by the depth sensing equipment module or a size of the group of connected pixels.

The control module may be further to receive condition data regarding at least the depth sensing device, determine a configuration for the depth sensing device based on the condition data and configure the mode of operation for the depth sensor equipment module also based on the configuration. In at least one embodiment, the control module may be further to determine whether the depth sensing device is coupled to a host device, receive condition data regarding the host device based on the determination that the depth sensing device is coupled to the host device and determine the configuration for at least one of the depth sensing device or the host device based on the condition data received from the depth sensor device and the host device. The control module may be further to determine if there has been scene change based on at least one of the condition data or depth data and reconfigure the mode of operation for the depth sensor based on a determination that the scene has changed.

In at least one embodiment, in configuring the mode of operation the control module may be to at least one of enable components in the depth sensing equipment module, adjust focus for components in the depth sensing equipment module, configure image orientation for components in the depth sensing equipment module or select a depth sensing methodology for components in the depth sensing equipment module. The depth sensing equipment module may comprise at least a red, green and blue (RGB) sensor, an infrared (IR) emitter, a first IR sensor positioned apart from the IR emitter and a second IR sensor positioned proximate to the IR emitter.

In configuring the mode of operation, the control module may be to enable the IR emitter and the first IR sensor for close-range depth sensing. In addition, in configuring the mode of operation the control module may also be to enable the second IR sensor for mid-range depth sensing. In at least one embodiment, the second IR sensor may be movable within the depth sensor equipment module, and in configuring the mode of operation the control module may be to cause the depth sensor equipment module to position the second IR sensor at a first position when configured for mid-range depth sensing or at a second position at a greater distance from the first IR sensor for long-range depth sensing. Alternatively, the depth sensing equipment module may comprise a third IR sensor positioned at a greater distance from the first IR sensor than the second IR sensor, and in configuring the mode of operation the control module is to enable the RGB sensor, the IR emitter, the first IR sensor and the third IR sensor for long-range depth sensing. Consistent with the present disclosure, an example method for configuring a depth sensing device may comprise receiving condition data at a control module in a depth sensor device, determining a configuration for at least the depth sensor device based on the condition data, receiving depth data at the control module from the depth sensor device and configuring a mode of operation for a depth sensor equipment module in the depth sensor device based at least on the determined configuration and the depth data.

FIG. 1 illustrates an example adaptable depth sensor system in accordance with at least one embodiment of the present disclosure. System 100 may comprise, for example, at least DS device 102 and host device 104. DS device 102 may be a separate device coupled to host device 104 via a wired or wireless connection, or may be integrated into host device 104. Examples of host device 104 may comprise, but are not limited to, a mobile communication device such as a cellular handset or smartphone based on the Android® OS and/or Chrome OS® from the Google Corporation, iOS® and/or Mac® OS from the Apple Corporation, Windows® OS from the Microsoft Corporation, Tizen® OS from the Linux Foundation, Firefox® OS from the Mozilla Project, Blackberry® OS from the Blackberry Corporation, Palm® OS from the Hewlett-Packard Corporation, Symbian® OS from the Symbian Foundation, etc., a mobile computing device such as a tablet computer like an iPad® from the Apple Corporation, Nexus® from the Google Corporation, Surface® from the Microsoft Corporation, Galaxy Tab® from the Samsung Corporation, Kindle Fire® from the Amazon Corporation, etc., an Ultrabook® including a low-power chipset manufactured by Intel Corporation, a netbook, a notebook, a laptop, a palmtop, etc., a wearable device such as a wristwatch form factor computing device like the Galaxy Gear® from Samsung, an eyewear form factor computing device/user interface like Google Glass® from the Google Corporation, a virtual reality (VR) headset device like the Gear VR® from the Samsung Corporation, the Oculus Rift® from the Oculus VR Corporation, etc., a typically stationary computing device such as a desktop computer, a smart television, small form factor computing solutions (e.g., for space-limited applications, TV set-top boxes, etc.) like the Next Unit of Computing (NUC) platform from the Intel Corporation, etc. While host device 104 may be any of the example devices listed above, a typical usage scenario may involve host device 104 being a portable communication or portable computing device with a variety of different operational modes. Host device 104 may be shown and/or described herein (e.g., in FIGS. 2 and 3) using these example configurations to provide a readily comprehensible context for understanding the various embodiments consistent with the present disclosure.

DS device 102 may comprise, for example, control module 106, DS equipment module 108, and optionally condition module 110. In general, control module 106 may receive at least one of depth data (DD) 112 or conditional data (CD) 114 (e.g., CD 114A regarding DS device 102 and/or CD 114B regarding host device 104) and may employ CD 114 in determining DS configuration (DSC) 116. DD 112 may generally comprise any data generated by DS device 102. For example, DS equipment module 108 may activate and generate DD 112 by sensing a "blob" (e.g., a group of connected pixels). A rough distance from the DS device 102 to at least one pixel in the blob sensed using, for example, RGB sensing only, IR sensing only, combined RGB and IR sensing, etc. may be indicative of an operational mode to select (e.g. close-range, mid-range or long-range sensing). Alone or in combination with the sensed distance, the size of the blob may also be indicative of the required sensing mode. For example, a large blob may indicate that potential targets are close to DS device 102, and thus, that close-range sensing is required. Sensing smaller blobs may indicate that the potential targets are further away from DS device 102 and that mid-range or long-range sensing should be employed. Other target ranging methods may also be employed. One method may comprise continuously sensing near-range, mid-range and far-range to generate multiple depth maps. The best operational mode may then be selected by inputting data from different depth maps into various determination algorithms.

CD 114A and CD 114B (collectively, "CD 114A/B") may comprise data regarding the condition of DS device 102 and/or host device 104, respectively. "Condition" as referenced herein may include, but is not limited to, the current mechanical configuration of DS device 102 and/or host device 104 (e.g., open, closed, docked with keyboard, etc.), the current software configuration of DS device 102 and/or host device 104 (e.g., active software, the type of application for which DS is required, etc.), the environment in which DS device 102 and/or host device 104 are operating (e.g., sensed background, light/dark, interference, motion, etc.), etc. In at least one embodiment CD 114A may be provided by condition module 110. The presence of condition module 110 in DS device 102 may depend on, for example, whether DS device 102 includes at least one sensor for detecting position, orientation, movement, etc. of DS device 102. Condition module 110 may not be present in an example implementation where DS device 102 is integrated into host device 104 with a fixed orientation. CD 114B may be provided to DS device 102 from host device 104 via condition module 110, or in the absence of condition module 110 may be provided directly to control module 106. CD 114B may be transmitted to DS device 102 via a wired or wireless link depending on the relationship between DS device 102 and host device 104. Examples of how DS device 102 and host device 104 may be related will be discussed in regard to FIGS. 2 and 3.

Control module 106 may determine the mode of DS to be performed based on DD 112 and/or CD 114A/B, and may the configure DS equipment module 108 as shown at 116. DS equipment module 108 may comprise equipment (e.g., electronic, electromechanical and/or optical hardware), firmware, software, etc. for performing DS based on the configured operational mode. Operational modes may include, for example, close-range sensing, mid-range sensing and long-range sensing. Examples of the type of equipment that may be included within DS equipment module 108 will be described in regard to FIGS. 4 to 6.

Figure 2:
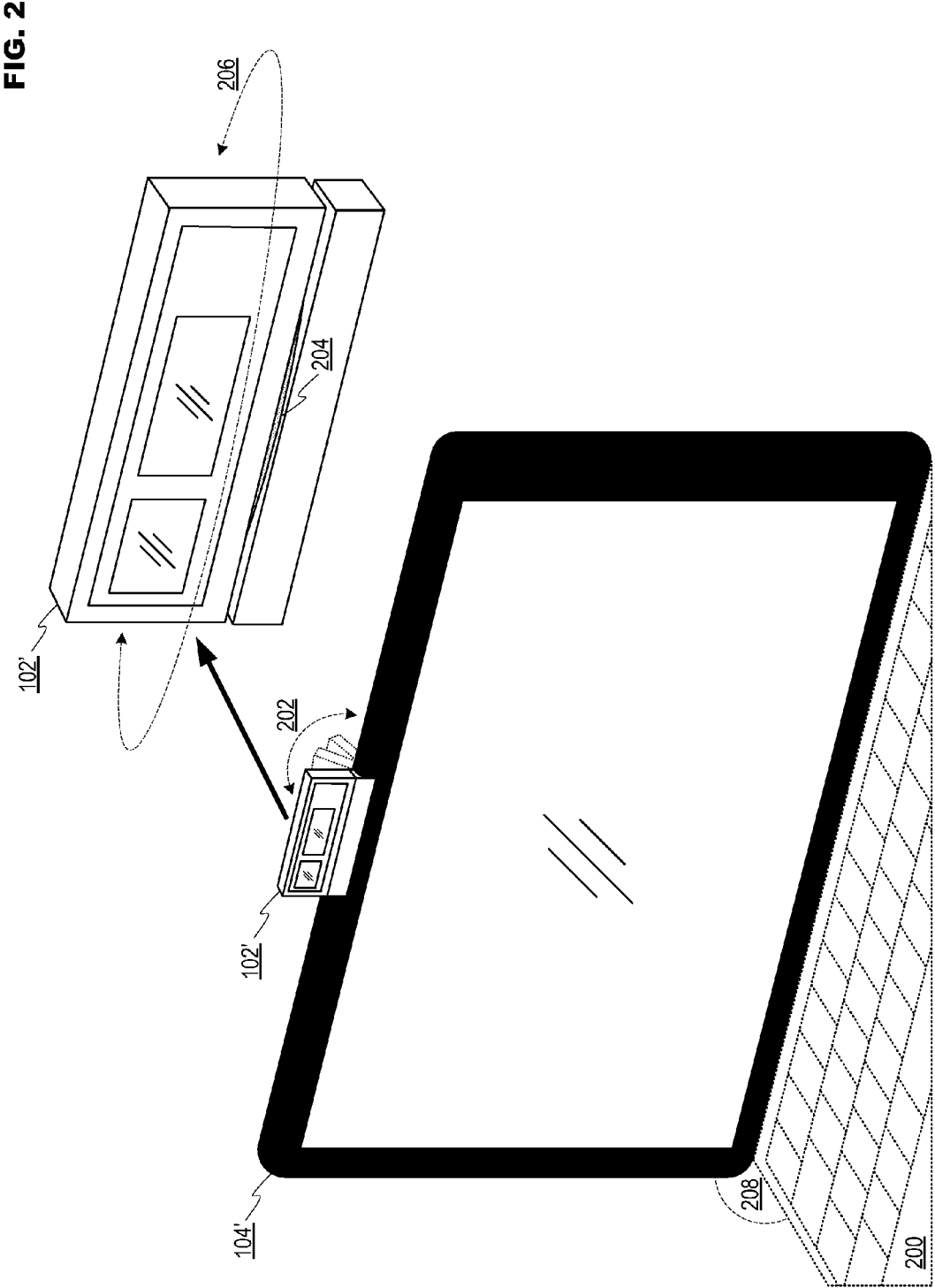
FIG. 2 illustrates an example implementation of an integrated depth sensor in accordance with at least one embodiment of the present disclosure.

FIG. 2 illustrates an example implementation of an integrated depth sensor in accordance with at least one embodiment of the present disclosure. Consistent with the present disclosure, host device 104' is presented as a platform to explain the operation of example DS device 102'. Host device 104' may be, for example, a smart phone, a tablet computer by itself or that is able to mate or dock with a keyboard unit 200, a notebook, a netbook, etc. DS device 102' may be integrated into host device 104' in a manner that allows DS device 102' to be stowed (e.g. in a retracted position) or deployed at various angles as shown at 202. DS device 102' may move automatically employing a mechanical (e.g., spring-loaded) or electromechanical (motor-driven) mechanism, may deploy manually through user manipulation, etc. For example, DS device 102' may be triggered to deploy automatically by executing an application that requires DS, interacting with a hard interface (e.g., a button), soft interface, etc. In at least one embodiment, DS device 102' may be utilized as illustrated in FIG. 2 in a "user-facing" orientation to capture an image, sense gestures made by a user (e.g., to control host device 104', to play a game, etc.). Control module 106 may receive CD 114A based on the deployment mechanism (e.g., feedback from a servo) or at least one sensor (e.g., angle sensor, gyroscope, etc.) and may then determine a mode of operation for DS equipment 108. Without considering DD 112 or other CD 114A/B, the mode of operation may be determined to be close-range sensing. Other CD 114A/B may also be indicative of close-range sensing. For example, if host device 104' is a laptop, notebook, netbook, etc., angle 208 occurring between the screen portion and keyboard portion of the device may be sensed and may be further indicative of close-range sensing. Mid-range or long-range sensing may be considered based on DD 112 (e.g., sensing a distance to at least one pixel in a blob from DS device 102', sensing small blobs corresponding to distant objects instead of a large close-proximity blob) and/or other CD 114A/B (e.g., determining that an application requires mid-range or long-range sensing, that host device 104' is being held by a user based on sensed movement, host device 104' not being docked in keyboard unit 200, etc.).

In the same or a different embodiment, DS device 102' may include a swivel or joint 204 that allows the orientation of host to change as shown at 206. Again, the orientation 206 of DS device 102' may change automatically (e.g., via an electromechanical mechanism) or manually via user manipulation. Reorienting device 102' to face the opposite direction (e.g., 180 degrees from the user-facing position) may be deemed a "world-facing" orientation. Control module 106 may be able to determine the orientation of DS device 102' based on data sensed from joint 204, and may consider configuring mid-range sensing or long-range sensing based on this orientation. For example, world-facing orientation may be utilized for capturing images, playing video games based on the movement of the user's entire body, larger scale videoconferencing, etc.

Figure 3:
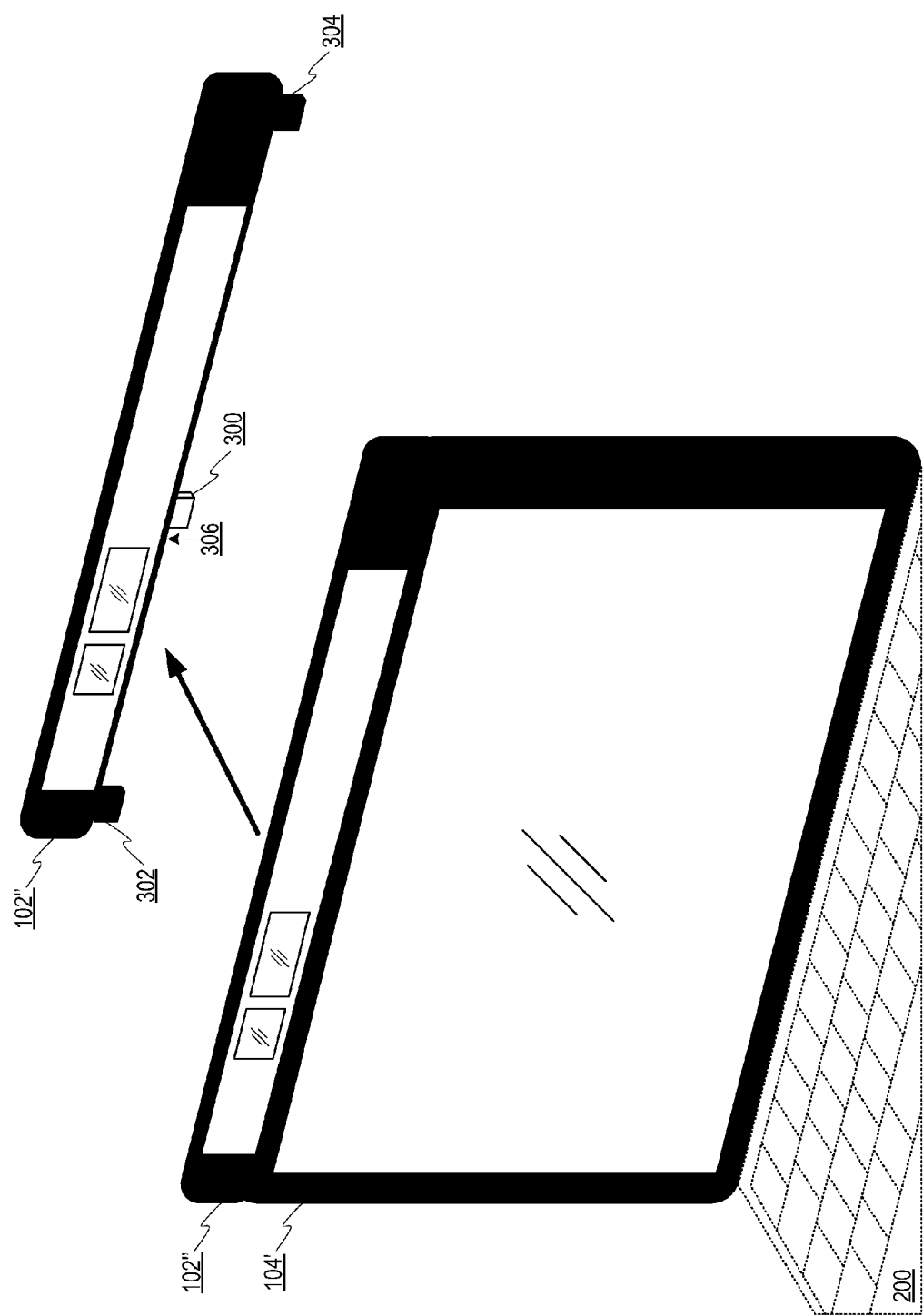
FIG. 3 illustrates an example implementation of a detachable depth sensor in accordance with at least one embodiment of the present disclosure.

FIG. 3 illustrates an example implementation of a detachable depth sensor in accordance with at least one embodiment of the present disclosure. Host device 104' in FIG. 3 may have the same or a substantially similar configuration to that described in FIG. 2. However, in FIG. 3 DS device 102" may be removable from host device 104'. DS device 102" may include connector 300 that plugs into host device 104' to provide wired communication when the two devices are mated together. Extensions 302 and 304 may be used to mechanically couple DS device 102" to host device 104'. When mated, DS device 102" may operate as part of host device 104'. In at least one embodiment, DS device 102" may be "reversible" in that it may be mated in either a user-facing or world-facing orientation. For example, connector 300 may be a Universal Serial Bus (USB) type C connector, and an orientation for DS device 102" may be determined based on pin connectivity information for the type C connector that may be determined in device 104' when coupled to DS device 102". When not mated to host device 104', DS device 102" may operate as a standalone depth sensor. For example, connector 306 may be retracted into DS device 102" as shown at 306, and extensions 302 and 304 may operate as part of a leg system for positioning DS device 102" on a tabletop. In at least one embodiment, control module 106 may receive CD 114A/B indicating whether DS device 102" is mated with host device 104', and this information may be utilized in determining an operational mode for DS equipment module 108. For example, control module 106 may configure close-range sensing when DS device 102" is mated in a user-facing orientation, and mid-range or long-range sensing when DS device 102" is mated in a long range configuration. When not mated (e.g., when DS device 102" operates separately from host device 104'), control module 106 may default to mid-range or long-range sensing based on typical usage, may utilize DD 112 and/or CD 114A provided by at least one sensor in condition module 110 to determine the appropriate operational mode to configure, etc.

Figure 4:
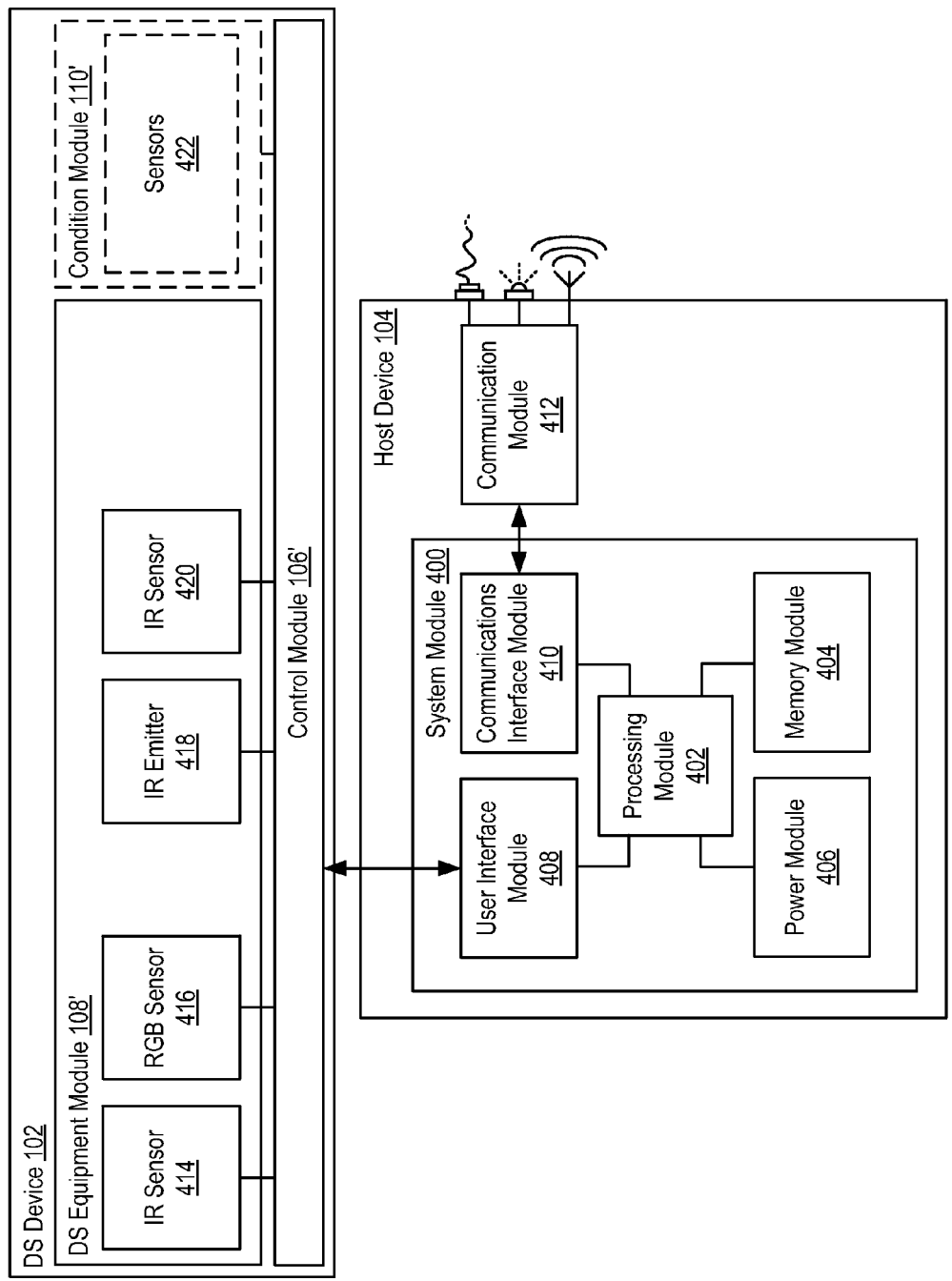
FIG. 4 illustrates example modular configurations for a depth sensor and host device in accordance with at least one embodiment of the present disclosure.

FIG. 4 illustrates example modular configurations for a depth sensor and host device in accordance with at least one embodiment of the present disclosure. DS device 102 and/or host devices 104 may be capable of performing example functionality such as discussed in regard to FIGS. 1 to 3. However, the configurations of DS device 102 and/or host device 104 are meant only as examples that may be usable in embodiments consistent with the present disclosure, and are not meant to limit these various embodiments to any particular manner of implementation.

Example host device 104 may comprise, for example, system module 400 configured to manage device operations. System module 400 may include, for example, processing module 402, memory module 404, power module 406, user interface module 408 and communication interface module 410. Host device 104 may also include communication module 412. While communication module 412 has been shown as separate from system module 400, the example implementation illustrated in FIG. 4 has been provided merely for the sake of explanation. Some or all of the functionality associated with communication module 412 may also be incorporated into system module 400.

In host device 104, processing module 402 may comprise one or more processors situated in separate components, or alternatively, one or more processing cores embodied in a single component (e.g., in a System-on-a-Chip (SoC) configuration) and any processor-related support circuitry (e.g., bridging interfaces, etc.). Example processors may include, but are not limited to, various x86-based microprocessors available from the Intel Corporation including those in the Pentium, Xeon, Itanium, Celeron, Atom, Quark, Core i-series, Core M-series product families, Advanced RISC (e.g., Reduced Instruction Set Computing) Machine or "ARM" processors, etc. Examples of support circuitry may include chipsets (e.g., Northbridge, Southbridge, etc. available from the Intel Corporation) configured to provide an interface through which processing module 402 may interact with other system components that may be operating at different speeds, on different buses, etc. in host device 104. Some or all of the functionality commonly associated with the support circuitry may also be included in the same physical package as the processor (e.g., such as in the Sandy Bridge family of processors available from the Intel Corporation).

Processing module 402 may be configured to execute various instructions in host device 104. Instructions may include program code configured to cause processing module 402 to perform activities related to reading data, writing data, processing data, formulating data, converting data, transforming data, etc. Information (e.g., instructions, data, etc.) may be stored in memory module 404. Memory module 404 may comprise random access memory (RAM) or read-only memory (ROM) in a fixed or removable format. RAM may include volatile memory configured to hold information during the operation of host device 104 such as, for example, static RAM (SRAM) or Dynamic RAM (DRAM). ROM may include non-volatile (NV) memory modules configured based on BIOS, UEFI, etc. to provide instructions when host device 104 is activated, programmable memories such as electronic programmable ROMs (EPROMS), Flash, etc. Other fixed/removable memory may include, but are not limited to, magnetic memories such as, for example, floppy disks, hard drives, etc., electronic memories such as solid state flash memory (e.g., an embedded multimedia card (eMMC), a solid state drive (SSD), etc.), removable memory cards or sticks (e.g., micro storage device (uSD), USB, etc.), optical memories such as compact disc-based ROM (CD-ROM), Digital Video Disks (DVD), Blu-Ray Disks, etc.

Power module 406 may include internal power sources (e.g., a battery, fuel cell, etc.) and/or external power sources (e.g., electromechanical or solar generator, power grid, external fuel cell, etc.), and related circuitry configured to supply host device 104 with the power needed to operate. User interface module 408 may include hardware and/or software to allow users to interact with host device 104 such as, for example, various input mechanisms (e.g., microphones, switches, buttons, knobs, keyboards, speakers, touch-sensitive surfaces, one or more sensors configured to capture images and/or sense proximity, distance, motion, gestures, orientation, biometric data, etc.) and various output mechanisms (e.g., speakers, displays, lighted/flashing indicators, electromechanical components for vibration, motion, etc.). The hardware supporting user interface module 408 may be incorporated within host device 104 and/or may be coupled to host device 104 via a wired or wireless communication medium.

Communication interface module 410 may be configured to manage packet routing and other control functions for communication module 412, which may include resources configured to support wired and/or wireless communications. In some instances, host device 104 may comprise more than one communication module 412 (e.g., including separate physical interface modules for wired protocols and/or wireless radios) managed by a centralized communication interface module 410. Wired communications may include serial and parallel wired mediums such as, for example, Ethernet, USB, Firewire, Thunderbolt, Digital Video Interface (DVI), High-Definition Multimedia Interface (HDMI), etc. Wireless communications may include, for example, close-proximity wireless mediums (e.g., radio frequency (RF) such as based on the RF Identification (RFID) or Near Field Communications (NFC) standards, infrared (IR), etc.), short-range wireless mediums (e.g., Bluetooth, WLAN, Wi-Fi, etc.), long-range wireless mediums (e.g., cellular wide-area radio communication technology, satellite-based communications, etc.), electronic communications via sound waves, etc. In one embodiment, communication interface module 410 may be configured to prevent wireless communications that are active in communication module 412 from interfering with each other. In performing this function, communication interface module 410 may schedule activities for communication module 412 based on, for example, the relative priority of messages awaiting transmission. While the embodiment disclosed in FIG. 4 illustrates communication interface module 410 being separate from communication module 412, it may also be possible for the functionality of communication interface module 410 and communication module 412 to be incorporated into the same module.

In a general example of operation, DS device 102 may perform DS utilizing a combined invisible and visible methodology. The visible portion of DS may employ at least one camera (e.g., RGB sensor) to capture at least one image or video of the area. The at least one image or video may impart visual value to the invisible aspect of DS. It may also be possible to perform DS using two RGB sensors configured to triangulate the position of different points in a target area. The invisible portion of DS may employ technologies such as, but not limited to, IR, ultraviolet, ultrasonic, etc. to project a pattern over a target area. The pattern may be simple (e.g., an array of dots) or may be coded (e.g., different areas may be assigned different numbers). Sensors may then detect the pattern and determine relative depth based on their sensing. For example, the distortion in the projected pattern (e.g., the variance in distance between the dots) may equate to different depths, changes in depth, etc. The quality (e.g., resolution) generated from DS, the maximum distance for DS, etc. may be affected by the equipment utilized in DS equipment module 108', the sensing methodology employed, etc., which will be discussed further in regard to FIGS. 5 and 6.

In DS device 102, example DS equipment module 108' may comprise, for example, at least IR sensor 414, RGB sensor 416, IR emitter 418 and IR sensor 420. Sensors and emitters 414 to 420 may be formulated as all-in-one integrated circuit (IC) solutions, multichip modules or more complex electronic/electromechanical assemblies. For example, IR sensor 414 and RGB sensor 416 may be combined using dual aperture technology that allows a single sensor to output both IR and RGB images, which may reduce cost, size, etc. In at least one embodiment, sensors and emitters 414 to 420 may be individually controlled by control module 106'. For example, control module 106' may control at least whether IR sensors 414, 420 and RGB sensor 416 are enabled (e.g., sensing or not sensing) and lens focus (e.g., by controlling electromechanical lens focus assemblies associated with each of these sensors). Control module 106' may also control the emission power of IR sensor 420 and the type of emission (e.g., the type of pattern emitted by IR sensor 420). In at least one embodiment, DS device 102 may comprise condition module 110'. Condition module 110' may include at least sensors 422 for sensing position, orientation, motion, etc. in regard to at least DS device 102. The output of sensors 422 may be employed to generate CD 114A. Control module 106' may receive at least CD 114A from condition module 110' for use in determining a configuration for DS equipment module 108' (e.g., for sensors and emitters 414 to 420). Consistent with the present disclosure, control module 106' may receive CD 114B alone or in conjunction with CD 114A. For example, if DS device 102 is permanently integrated into host device 104, then CD 114B generated by, for example, user interface module 408 may provide condition information for both DS device 102 and host device 104. Control module 106' may interact with user interface module 408 via a direct and/or dedicated interface (e.g., if DS device is integrated within host device 104). Alternatively, control module 106' and module within host device 104 (e.g., user interface module 408) may interact via wired and/or communication supported by communication module 412. Communication module 412 may be employed in situations where, for example, DS device 102 may be communicatively coupled to host device 104 through a common interface (e.g., USB, Ethernet, etc.), may interact remotely with host device 104 via short-range wireless communication (e.g., Bluetooth, WLAN, etc.), etc.

In at least one embodiment, control module 106' may configure various attributes in at least IR sensor 414, RGB sensor 416, IR emitter 418 and IR sensor 420. For example, control module 106' may enable IR sensor 414, RGB sensor 416, IR emitter 418 and/or IR sensor 420, may configure focus for IR sensor 414, RGB sensor 416, IR emitter 418 and/or IR sensor 420, may configure image orientation for IR sensor 414, RGB sensor 416 and/or IR sensor 420, and/or may configure at least IR emitter 418 to emit a certain IR signal (e.g., structured and/or coded), at a certain intensity, etc. based on a DS methodology. Image orientation may include, for example, flipping captured IR and RGB images top to bottom, if necessary, when DS device 102 is moved, rolled, flipped, etc. (e.g., from a user-facing to a world facing orientation) to keep the images right side up. Examples of how the various components in DS equipment module 108' may be configured based on operational mode are disclosed in regard to FIGS. 5 and 6.

FIG. 5 illustrates example configurations for single sensor close-range sensing and dual sensor mid-range sensing in accordance with at least one embodiment of the present disclosure. Two examples 500 and 502 are shown in FIG. 5 to explain how control module 106' may control DS equipment module 108' based on a determined mode of operation. Initially, RGB sensor 416 may be enabled in any or all of the examples in FIG. 5 to collect visual data corresponding to the depth sensing data. In a first example, single sensor close-range sensing is presented at 500. Given an example scenario wherein control module 106' has determined that DS equipment module 108' should be configured for close-range sensing, IR sensor 414 and IR emitter 418 may be enabled for operation, and the focus of IR sensor 414 may be set for close range (e.g., less than one meter). IR emitter 418 may also be configured to emit IR light with a certain pattern, intensity, etc. In one embodiment, control module 106' may configure IR emitter 418 to emit a structured/coded pattern for performing close-range DS based on, for example, Intel Realsense F200 (e.g., "F" indicates front-facing towards the user) technology.

An example dual sensor mid-range sensing configuration is shown at 502. In example 502, control module 106' may utilize a different DS methodology for mid-range to long-range sensing. Some methodologies may employ an addition sensor to maintain resolution at a longer distance, and thus, may enable a second IR sensor 420. In at least one embodiment, control module 106' may configure IR emitter 418 to emit at least a structured pattern for performing mid-to-long-range DS based on, for example, Intel Realsense R200 (e.g., "R" indicates rear-facing towards the world) technology. Control module 106' may also refocus the lens of IR sensor 414 and RGB sensor 416 for mid-range distance (e.g., 1 to 3 m) DS, and may reconfigure IR emitter 418 to emit a pattern at a power level more appropriate for longer distance DS. For example, some mid-range sensing technologies may not employ coded IR emissions (e.g., just a pattern comprising an array of dots).

FIG. 6 illustrates example configurations for dual far-range sensing utilizing an additional sensor or a movable sensor in accordance with at least one embodiment of the present disclosure. Initially, RGB sensor 416 may be enabled in any or all of the examples in FIG. 6 to collect visual data corresponding to the depth sensing data. Consistent with the present disclosure, dual sensor mid-range sensing may differ from dual sensor long-range sensing based mainly on the distance between the IR sensors, the focus of the IR sensors and possibly the IR emission intensity and/or pattern. Examples 600 and 602 describe two possible configurations for increasing the distance from IR sensor 414 to a second IR sensor to facilitate DS over longer distances. In example 600, DS equipment module 108' may comprise an additional IR sensor 604 arranged specifically for long-range sensing in that, for example, IR sensor 604 is further away from IR sensor 414 than IR sensor 420 to support long-range sensing, comprises a certain orientation/focus to sense IR emissions from IR emitter 418 at long-range, etc. In an example of operation, control module 106' may determine that long-range sensing is required, may disable IR sensor 420 and enable IR sensor 604. Control module 106' may then configure the focus and/or operation of IR sensor 604 in a manner similar to that described above in regard to IR sensors 414 and 420. Disabling IR sensor 420 may allow power consumption to be regulated in DS device 102. In at least one embodiment, control module 106' may configure IR emitter 418 to emit at least a structured pattern for performing long-range DS based on, for example, Intel Realsense R200 technology.

In the alternative configuration disclosed at 602, IR sensor 420 may be repositionable in DS device 102. For example, an electromechanical apparatus may move IR sensor 420 between first position 606 for mid-range sensing and second position 608 for longer-range sensing. In at least one embodiment, IR sensor 420 may be moved to various locations between first position 606 and second position 608 based on a sensed distance to a target (e.g., the sensed distance to a blob of pixels). As described above, IR sensor 420 may be refocused and/or reconfigured at first position 606, at second position 608 or at a location in-between based on the operational mode determined in DS control module 106'. Example configuration 602 allows control module 106' to configure stereo IR sensing for any operational mode of DS equipment module 108' (e.g., close-range, mid-range and long-range sensing) without incorporating additional IR sensor 604.

Figure 7:
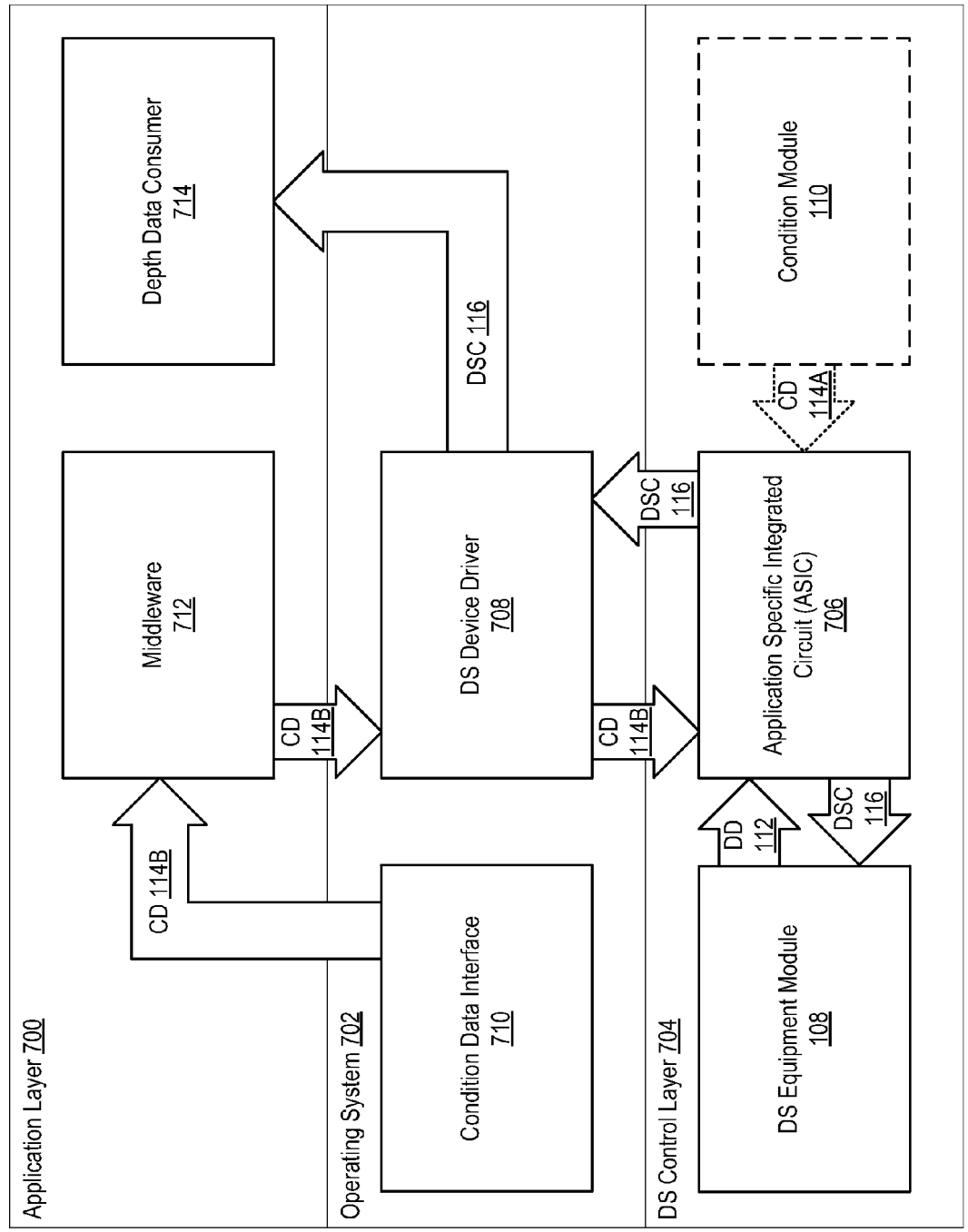
FIG. 7 illustrates an example control configuration for a combined depth sensor and host device in accordance with at least one embodiment of the present disclosure.

FIG. 7 illustrates an example control configuration for a combined depth sensor and host device in accordance with at least one embodiment of the present disclosure. Application layer 700, OS layer 702 and DS control layer 704 may correspond to different hierarchical levels of control, permission, etc. that may exist in DS device 102 and/or host device 104. DS control layer 704 may correspond to low-level, high-permission control resources executing specifically in DS device 102. In at least one embodiment, application specific integrated circuit (ASIC) 706 comprising, for example, logic, memory and control resources may be configured to control the operation of DS equipment module 108 based at least on DD 112 and/or CD 114 A/B.

OS layer 702 may comprise at least condition data interface 710 and DS device driver 708. CD 114A may be generated in operating system layer 702 of DS device 102 and/or host device 104. Condition data interface may comprise hardware and/or software for collecting CD 114B (e.g., sensor data, running application data, hardware status data, etc.). Middleware (e.g., an application running in application layer 700) may receive CD 114B collected by condition data interface 710 and may provide CD 114B to ASIC 706 via DS driver 708 in OS layer 702.

Upon receiving DD 112, CD 114A from condition module 110 (e.g., if present in DS device 102) and/or CD 114B, ASIC 706 may determine DSC 116 for DS equipment module 108. For example, ASIC 706 may determine whether DS equipment module 108 should be configured for close-range sensing, mid-range sensing or long-range sensing. In at least one embodiment, ASIC 706 may also determine other configurations for DS equipment module 108 pertaining to the selected operational mode. For example, background characteristics, interference, motion, etc. may be determined based on DD 112 and/or CD 114A/B, and these inputs may cause ASIC 706 to further configure DS equipment module 108 for noise filtering, image stabilization, etc. Consistent with the present disclosure, DSC 116 may also be provided to DS device driver 708 so that any depth data consumer 714 (e.g., an application that requires DS and that may have triggered the activation of DS module 102) may be informed of currently configured operational mode.

FIG. 8 illustrates example operations for configuring an adaptable depth sensor system in accordance with at least one embodiment of the present disclosure. Initially, a DS device may be triggered in operation 800. Example activities that may trigger the DS device include connection to, or disconnection from, a host device, executing an application on the host device that requires DS, activating an application function requiring DS, user interaction with the DS device or host device, etc. A determination may then be made in operation 802 as to whether the DS device is coupled to a host device. If it is determined in operation 806 that the DS device is not coupled to a host device, then in operation 804 only condition data generated in the DS device may be employed in determining a configuration for the DS device. Otherwise, if it is determined in operation 802 that the DS device is coupled to a host device, then in operation 806 condition data from both the DS device and host device may be used to determine DS device configuration.

Operation 808 may be optional as some devices (e.g., a smart phone, a tablet computer without keyboard, etc.) may not have an on-table configuration. However, determining if the DS device and/or host device are in an on-table configuration in operation 808 may be applicable to reconfigurable devices like laptops, notebooks, netbooks, tablet computers that may be docked with an external keyboard unit, etc. Table-top configuration may be determined based on motion sensing in either the DS device or host device, the relative orientation of different portions of the DS device and/or host device (e.g., orientation of the DS device as user-facing or world-facing, etc., angle of a laptop display portion to a keyboard portion, etc.), the applications running on the host device (e.g., gesture-based control interface, videoconference software, hand-gesture or body gesture based games, photography software, etc.), etc. If in operation 808 it is determined that the DS device and/or host device are not in an on-table configuration (e.g., the host device is in a portable or hand-held configuration), then in operation 812 the DS device may be configured in portable mode. Initially, portable mode may indicate that it is more likely that the DS device will be performing mid-range sensing or long-range sensing. Additionally, portable mode may also cause other functionality to be invoked such as filtering, image stabilization, higher image capture speed, lower resolution, etc. A determination in operation 808 that the DS device and/or host device is in an on-table configuration may be followed a determination as to whether the DS device and/or host device is sensed to be in motion. For example, a laptop or similar device may be in an on-table configuration but may still be carried around by a user. If in operation 810 the DS device and/or host device is determined to be in motion, then again in operation 812 the portable mode may be configured in the DS device. If in operation 819 no substantial motion is detected, then in operation 814 the DS device may be configured in stationary mode. Stationary mode may imply a higher probability for close-range (e.g., user-facing) sensing, and may invoke other functionality such as lower filtering, higher resolution sensing, lower capture speed, etc.

Following operations 812 or 814, a determination may then be made as to whether a close range blob is sensed by the DS device. A blob may be a group of connected pixels sensed by the DS device corresponding to a target object (e.g., a user, another person, an object, a landscape, etc.) to be sensed. A distance to the blob, a size of the blob, etc. may be sensed to determine the most appropriate mode of operation to configure. If in operation 816 it is determined that a close-range blob is sensed (e.g., at least one pixel of the blob being sensed in close proximity, the blob appears to occupy a large portion of the sensing area indicating that the object may be close to the DS device, etc.), then in operation 818 close-range sensing may be configured in the DS device. If in operation 816 it is determined that there is not a blob at close range, then a further determination may be made in operation 820 as to whether a blob is sensed corresponding to mid-range sensing (e.g., at least one pixel of the blob being sensed at a distance considered to be mid-range, the blob occupying a proportion of the sensing area corresponding to an object such as a person at 1 to 3 m away from the DS device, etc.). If in operation 820 it is determined that the blob is sensed at mid-range, then in operation 822 a mid-range sensing operational mode may be configured in the DS device. Alternatively, if it is determined in operation 820 that the blob has not been sensed at mid-range, then in operation 824 long-range sensing may be configured. The various operations illustrated in FIG. 8 may reinitiate at operation 800 whenever, for example, the DS device is triggered as set forth above.

FIG. 9 illustrates example operations for detecting a scene change for an adaptable depth sensor system in accordance with at least one embodiment of the present disclosure. In general, a "scene change" is a condition where something in regard to the DS device, the host device, the target, etc. has changed to such a degree that reconfiguration of the DS device and/or host device should be considered. In operation 900 depth sensing may be performed by a DS device alone or in combination with a host device. A determination may then be made in operation 902 as to whether "significant motion" has been detected in regard to the DS device and/or the host device. Significant motion may be a relative measure and may be tied to, for example, motion expected when the DS device and/or host device are configured in portable mode (e.g., handheld) as opposed to stationary mode (e.g., on-table configuration). If in operation 902 it is determined that significant motion is detected, then in operation 904 a further determination may be made as to whether the DS device and/or host device are configured in stationary mode. If in operation 906 it is determined that the DS device and/or host device are configured in stationary mode, then in operation 906 a scene change is determined. Operation 906 may be followed by, for example, a return to operation 800 in FIG. 8 to reconfigure the DS device and/or host device.

If in operation 902 it is determined that significant motion is not detected (e.g., over a time period indicating that the DS device and/or host device is not moving, is no longer moving, etc.), then in operation 908 a further determination may be made as to whether the DS device and/or host device are configured in portable mode. If in operation 908 it is determined that the DS device and/or host device are configured in portable mode, then in operation 910 a scene change may be determined, which may be followed by a return to operation 800 in FIG. 8 to reconfigure the DS device and/or host device. A determination in operation 904 that the DS device and/or host device are not in stationary mode, or alternatively a determination in operation 908 that the DS device and/or host device are not in portable mode, may be followed by further determination in operation 912 as to whether there has been a change in orientation for the DS device. A change in orientation may comprise moving the DS device with respect to the host device (e.g., moving, flipping, rolling, etc. a DS device that may be incorporated in the host device from a user-facing position to a world-facing position), disconnecting/reconnecting the DS device from/to the host device, etc. If in operation 912 it is determined that there has been a change in orientation for the DS device, then in operation 906 a scene change may be determined and in operation 800 of FIG. 8 the DS device and/or host device may be reconfigured.

If in operation 912 it is determined that no change in DS orientation has occurred, then in operation 914 a further determination may be made as to whether a change in blob depth has occurred. For example, a change in blob depth may be determined by a change in distance from the DS device to at least one pixel in the blob, a change in size in the blob, etc. If in operation 914 it is determined that the blob depth has changed, a further determination may be made in operation 916 as to whether the change in depth is steady over time. For example, sporadic changes in depth may be expected, especially when the DS device and/or the host device is in portable mode. However, if the blob depth change remains steady over a certain time period (e.g., which may be application specific), then the operational mode for the DS device and/or host device may need updating. If in operation 916 it is determined that the change in blob depth is steady over time, then in operation 906 a scene change may be determined and in operation 800 in FIG. 8 the DS device and/or host device may be reconfigured. Following a determination in operation 914 that the blob depth has not changed, or alternatively following a determination in operation 916 that the blob depth change has not been steady over time, in operation 918 the existing configuration of the DS device and/or host device may be maintained. Operation 918 may optionally be followed by a return to operation 900 to continue depth sensing.

While FIGS. 8 and 9 illustrate operations according to different embodiments, it is to be understood that not all of the operations depicted in FIGS. 8 and 9 are necessary for other embodiments. Indeed, it is fully contemplated herein that in other embodiments of the present disclosure, the operations depicted in FIGS. 8 and 9, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more storage mediums (e.g., non-transitory storage mediums) having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software modules executed by a programmable control device.

Thus, the present disclosure is directed to an adaptable depth sensing (DS) system. A DS device may comprise a DS equipment module and a control module. The control module may configure the operational mode of the DS equipment module for close-range sensing, mid-range sensing or long-range sensing. The control module may receive at least depth data from the DS equipment module for determining the mode of operation. The control module may also receive condition data regarding the DS device and/or a host device to which the DS device is coupled, determine a configuration based on the condition data, and may utilize the condition data along with the depth data to configure the DS equipment module. Configuring the DS equipment module may comprise, for example, enabling components within the DS equipment module, configuring focus for the components, configuring image orientation for the components and/or selecting a DS methodology for the components.

The following examples pertain to further embodiments. The following examples of the present disclosure may comprise subject material such as a device, a method, at least one machine-readable medium for storing instructions that when executed cause a machine to perform acts based on the method, means for performing acts based on the method and/or an adaptable DS system, as provided below.

According to example 1 there is provided a depth sensing device. The device may comprise a depth sensing equipment module to perform depth sensing and a control module to receive at least depth data from the depth sensing equipment module and configure a mode of operation for the depth sensor equipment module based at least on the depth data.

Example 2 may include the elements of example 1, wherein the depth data comprises at least one of a distance from the depth sensing device to at least one pixel in a group of connected pixels sensed by the depth sensing equipment module or a size of the group of connected pixels.

Example 3 may include the elements of any of examples 1 to 2, wherein the control module is further to receive condition data regarding at least the depth sensing device, determine a configuration for the depth sensing device based on the condition data and configure the mode of operation for the depth sensor equipment module also based on the configuration.

Example 4 may include the elements of example 3, wherein the control module is further to determine whether the depth sensing device is coupled to a host device, receive condition data regarding the host device based on the determination that the depth sensing device is coupled to the host device and determine the configuration for at least one of the depth sensing device or the host device based on the condition data received from the depth sensor device and the host device.

Example 5 may include the elements of example 4, wherein the condition data regarding at least one of the depth sensing device or the host device is received from a condition data module in the device.

Example 6 may include the elements of any of examples 4 to 5, wherein the condition data regarding the host device is received from a device driver executing in the host device that receives the condition data from middleware executing in the host device that receives the condition data from a condition data interface in the host device.

Example 7 may include the elements of any of examples 4 to 6, wherein the depth sensing device is incorporated into the host device.

Example 8 may include the elements of example 7, wherein the depth sensing device is repositionable with respect to the host device into at least a user-facing orientation and world-facing orientation.

Example 9 may include the elements of example 8, wherein the condition data comprises an indication of the orientation of the depth sensing device.

Example 10 may include the elements of any of examples 7 to 9, wherein the depth sensing device is detachable from the host device.

Example 11 may include the elements of example 10, wherein the depth sensing device is operable when detached from the host device and communicates with the host device utilizing at least wireless communication.

Example 12 may include the elements of any of examples 3 to 11, wherein the control module is further to determine if there has been scene change based on at least one of the condition data or depth data and reconfigure the mode of operation for the depth sensor based on a determination that the scene has changed.

Example 13 may include the elements of any of examples 3 to 12, wherein the control module is further to determine at least one of if at least one of the depth sensor device or the host device are in an on-table configuration, or if at least one of the depth sensor device or the host device are moving.

Example 14 may include the elements of any of examples 1 to 13, wherein in configuring the mode of operation the control module is to at least one of enable components in the depth sensing equipment module, adjust focus for components in the depth sensing equipment module, configure image orientation for components in the depth sensing equipment module or select a depth sensing methodology for components in the depth sensing equipment module.

Example 15 may include the elements of any of examples 1 to 14, wherein the depth sensing equipment module comprises at least a red, green and blue (RGB) sensor, an infrared (IR) emitter, a first IR sensor positioned apart from the IR emitter and a second IR sensor positioned proximate to the IR emitter.

Example 16 may include the elements of example 15, wherein in configuring the mode of operation the control module is to enable the IR emitter and the first IR sensor for close-range depth sensing.

Example 17 may include the elements of example 16, wherein in configuring the mode of operation the control module is to also enable the second IR sensor for mid-range depth sensing.

Example 18 may include the elements of example 17, wherein the second IR sensor is movable within the depth sensor equipment module and in configuring the mode of operation the control module is to cause the depth sensor equipment module to position the second IR sensor at a first position when configured for mid-range depth sensing or at a second position at a greater distance from the first IR sensor for long-range depth sensing.

Example 19 may include the elements of any of examples 15 to 18, wherein the depth sensing equipment module comprises a third IR sensor positioned at a greater distance from the first IR sensor than the second IR sensor and in configuring the mode of operation the control module is to enable the RGB sensor, the IR emitter, the first IR sensor and the third IR sensor for long-range depth sensing.

Example 20 may include the elements of any of examples 1 to 19, wherein the control module is further to receive condition data regarding at least the depth sensing device, determine whether the depth sensing device is coupled to a host device, receive condition data regarding the host device based on the determination that the depth sensing device is coupled to the host device and determine the configuration for at least one of the depth sensing device or the host device based on the condition data received from the depth sensor device and the host device.

Example 21 may include the elements of any of examples 1 to 20, wherein in configuring the mode of operation the control module is to enable an IR emitter and a first IR sensor in the depth sensing equipment module for close-range depth sensing and also enable a second IR sensor in the depth sensing equipment module for mid-range depth sensing.

Example 22 may include the elements of any of examples 1 to 21, wherein the control module comprises at least an application specific integrated circuit (ASIC).

According to example 23 there is provided a method for configuring a depth sensing device. The method may comprise receiving condition data at a control module in a depth sensor device, determining a configuration for at least the depth sensor device based on the condition data, receiving depth data at the control module from the depth sensor device and configuring a mode of operation for a depth sensor equipment module in the depth sensor device based at least on the determined configuration and the depth data.

Example 24 may include the elements of example 23, and may further comprise determining whether the depth sensor device is coupled to a host device, receiving condition data from the host device based on a determination that the depth sensor device is coupled to the host device and determining the configuration based also on the condition data received from the host device.

Example 25 may include the elements of any of examples 23 to 24, wherein determining the configuration comprises determining at least one of, if at least one of the depth sensor device or the host device are in an on-table configuration or if at least one of the depth sensor device or the host device are moving.

Example 26 may include the elements of any of examples 23 to 25, and may further comprise determining if there has been scene change based on at least one of the condition data or depth data and reconfiguring the mode of operation for the depth sensor based on a determination that the scene has changed.

Example 27 may include the elements of any of examples 23 to 26, wherein configuring the mode of operation comprises at least one of enabling components in the depth sensing equipment module, adjusting focus for components in the depth sensing equipment module, configuring image orientation for components in the depth sensing equipment module or selecting a depth sensing methodology for components in the depth sensing equipment module.

Example 28 may include the elements of any of examples 23 to 27, wherein determining the mode of operation comprises configuring close-range depth sensing by enabling an infrared (IR) emitter and a first IR sensor in the depth sensing device and configuring mid-range depth sensing by also enabling a second IR sensor in the depth sensing device.

Example 29 may include the elements of example 28, wherein determining the mode of operation comprises configuring long-range depth sensing by disabling the second IR sensor and enabling a third IR sensor, or moving the second IR sensor in the depth sensing device.

According to example 30 there is provided a system including at least a depth sensing device and a host device, the system being arranged to perform the method of any of the above examples 23 to 29.

According to example 31 there is provided a chipset arranged to perform the method of any of the above examples 23 to 29.

According to example 32 there is provided at least one machine readable medium comprising a plurality of instructions that, in response to be being executed on a computing device, cause the computing device to carry out the method according to any of the above examples 23 to 29.

According to example 33 there is provided at least one device to configure a depth sensing device, the at least one device being arranged to perform the method of any of the above examples 23 to 29.

According to example 34 there is provided a system for configuring a depth sensing device. The system may comprise means for receiving condition data at a control module in a depth sensor device, means for determining a configuration for at least the depth sensor device based on the condition data, means for receiving depth data at the control module from the depth sensor device and means for configuring a mode of operation for a depth sensor equipment module in the depth sensor device based at least on the determined configuration and the depth data.

Example 35 may include the elements of example 34, and may further comprise means for determining whether the depth sensor device is coupled to a host device, means for receiving condition data from the host device based on a determination that the depth sensor device is coupled to the host device and means for determining the configuration based also on the condition data received from the host device.

Example 36 may include the elements of any of examples 34 to 35, wherein the means for determining the configuration comprise means for determining at least one of, if at least one of the depth sensor device or the host device are in an on-table configuration or if at least one of the depth sensor device or the host device are moving.

Example 37 may include the elements of any of examples 34 to 36, and may further comprise means for determining if there has been scene change based on at least one of the condition data or depth data and means for reconfiguring the mode of operation for the depth sensor based on a determination that the scene has changed.

Example 38 may include the elements of any of examples 34 to 37, wherein the means for configuring the mode of operation comprise means for at least one of enabling components in the depth sensing equipment module, adjusting focus for components in the depth sensing equipment module, configuring image orientation for components in the depth sensing equipment module or selecting a depth sensing methodology for components in the depth sensing equipment module.

Example 39 may include the elements of any of examples 34 to 38, wherein the means for determining the mode of operation comprise means for configuring close-range depth sensing by enabling an infrared (IR) emitter and a first IR sensor in the depth sensing device and means for configuring mid-range depth sensing by also enabling a second IR sensor in the depth sensing device.

Example 40 may include the elements of example 39, wherein the means for determining the mode of operation comprise means for configuring long-range depth sensing by disabling the second IR sensor and enabling a third IR sensor, or moving the second IR sensor in the depth sensing device.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A depth sensing device, comprising:
    depth sensing equipment circuitry to perform depth sensing, the depth sensing equipment circuitry comprising at least a red, green, and blue (RGB) sensor, an infrared (IR) emitter, a first IR sensor positioned apart from the IR emitter, and a second IR sensor positioned proximate to the IR emitter, wherein the second IR sensor is repositionable with the depth sensing equipment; and
    control circuitry to:
    receive at least depth data from the depth sensing equipment circuitry; and
    configure a mode of operation for the depth sensing equipment circuitry based at least on the depth data, wherein when said control circuitry configures the depth sensing equipment circuitry for mid-range depth sensing, the control circuitry causes the depth sensing equipment circuitry to position the second IR sensor at a first position that is a first distance from the first IR sensor, and when said control circuitry configures the depth sensing equipment circuitry for long-range depth sensing, the control circuitry causes the depth sensing equipment to physically move the second IR sensor to a second position that is a second distance from the first IR sensor, the second distance being greater than the first distance.

2. The device of claim 1, wherein the depth data comprises at least one of a distance from the depth sensing device to at least one pixel in a group of connected pixels sensed by the depth sensing equipment circuitry or a size of the group of connected pixels.

3. The device of claim 1, wherein the control circuitry is further to:
    receive condition data regarding at least the depth sensing device;
    determine a configuration for the depth sensing device based on the condition data; and
    configure the mode of operation for the depth sensor equipment circuitry also based on the configuration.

4. The device of claim 3, wherein the control circuitry is further to:
    determine whether the depth sensing device is coupled to a host device;
    receive condition data regarding the host device based on a determination that the depth sensing device is coupled to the host device; and
    determine the configuration for at least one of the depth sensing device or the host device based on the condition data received from the depth sensing device and the host device.

5. The device of claim 3, wherein the control circuitry is further to:
    determine if there has been scene change based on at least one of the condition data or depth data; and
    reconfigure the mode of operation for the depth sensing equipment circuitry based on a determination that the scene has changed.

6. The device of claim 1, wherein in configuring the mode of operation the control circuitry is to at least one of enable components in the depth sensing equipment circuitry, adjust focus for components in the depth sensing equipment circuitry, configure image orientation for components in the depth sensing equipment circuitry or select a depth sensing methodology for components in the depth sensing equipment circuitry.

7. The device of claim 1, wherein in configuring the mode of operation the control circuitry is to enable the IR emitter and the first IR sensor for close-range depth sensing.

8. The device of claim 7, wherein in configuring the mode of operation the control circuitry is to also enable the second IR sensor for mid-range depth sensing.

9. The device of claim 1, wherein the depth sensing equipment circuitry comprises a third IR sensor positioned at a greater distance from the first IR sensor than the second IR sensor; and
    in configuring the mode of operation the control circuitry is to enable the RGB sensor, the IR emitter, the first IR sensor and the third IR sensor for long-range depth sensing.

10. A method for configuring a depth sensing device, comprising:
    receiving condition data at control circuitry in a depth sensor device, the depth sensor device comprising at least a red, green, and blue (RGB) sensor, an infrared (IR) emitter, a first IR sensor positioned apart from the IR emitter, and a second IR sensor positions proximate to the IR emitter, wherein the second IR sensor is repositionable within the depth sensing device;
    determining a configuration for at least the depth sensor device based on the condition data;
    receiving depth data at the control circuitry from the depth sensor device; and
    configuring a mode of operation for the depth sensor device based at least on the determined configuration and the depth data;
    wherein:
    configuring the mode of operation comprises configuring said depth sensor device for mid-range depth sensing or long-range depth sensing;
    configuring said depth sensor device for mid-range depth sensing comprises positioning the second IR sensor at a first position that is a first distance from the first IR sensor; and configuring said depth sensor device for long-range depth sensing comprises physically moving the second IR sensor to a second location that is a second distance from the first IR sensor, the second distance being greater than the first distance.

11. The method of claim 10, further comprising:
    determining whether the depth sensor device is coupled to a host device;
    receiving condition data from the host device based on a determination that the depth sensor device is coupled to the host device; and
    determining the configuration based also on the condition data received from the host device.

12. The method of claim 11, wherein determining the configuration comprises determining at least one of, if at least one of the depth sensor device or the host device are in an on-table configuration or if at least one of the depth sensor device or the host device are moving.

13. The method of claim 10, further comprising:
  determining if there has been scene change based on at least one of the condition data or depth data; and
  reconfiguring the mode of operation for the depth sensor device based on a determination that the scene has changed.

14. The method of claim 10, wherein configuring the mode of operation comprises at least one of enabling components in the depth sensing device, adjusting focus for components in the depth sensing device, configuring image orientation for components in the depth sensing device or selecting a depth sensing methodology for components in the depth sensing device.

15. The method of claim 10, wherein determining the mode of operation comprises:
  configuring close-range depth sensing by enabling an infrared (IR) emitter and a first IR sensor in the depth sensing device; and
  configuring mid-range depth sensing by also enabling a second IR sensor in the depth sensing device.

16. The method of claim 15, wherein determining the mode of operation comprises:
  configuring long-range depth sensing by disabling the second IR sensor and enabling a third IR sensor, or moving the second IR sensor in the depth sensing device.

17. At least one non-transitory machine-readable storage medium having stored thereon, individually or in combination, instructions for configuring a depth sensing device that, when executed by one or more processors, cause the one or more processors to:
  receive condition data from control circuitry in a depth sensor device, the depth sensor device comprising at least a red, green, and blue (RGB) sensor, an infrared (IR) emitter, a first IR sensor positioned apart from the IR emitter, and a second IR sensor positions proximate to the IR emitter, wherein the second IR sensor is repositionable within the depth sensor device;
  determine a configuration for at least the depth sensor device based on the condition data;
  receive depth data from the control circuitry of the depth sensor device; and
  configure a mode of operation for the depth sensor device based at least on the determined configuration and the depth data;
  wherein;
  configuring the mode of operation comprises configuring said depth sensor device for mid-range depth sensing or long-range depth sensing;
  configuring said depth sensor device for mid-range depth sensing comprises positioning the second IR sensor at a first position that is a first distance from the first IR sensor; and configuring said depth sensor device for long-range depth sensing comprises physically moving the second IR sensor to a second location that is a second distance from the first IR sensor, the second distance being greater than the first distance.

18. The medium of claim 17, further comprising instructions that, when executed by one or more processors, cause the one or more processors to:
  determine whether the depth sensor device is coupled to a host device;
  receive condition data from the host device based on a determination that the depth sensor device is coupled to the host device; and
  determine the configuration based also on the condition data received from the host device.

19. The medium of claim 18, wherein the instructions to determine the configuration comprise instructions to determine at least one of, if at least one of the depth sensor device or the host device are in an on-table configuration or if at least one of the depth sensor device or the host device are moving.

20. The medium of claim 17, further comprising instructions that, when executed by one or more processors, cause the one or more processors to:
  determine if there has been scene change based on at least one of the condition data or depth data; and
  reconfigure the mode of operation for the depth sensor device based on a determination that the scene has changed.

21. The medium of claim 17, wherein the instructions to configure the mode of operation comprise instructions to at least one of enable components in the depth sensing device, adjust focus for components in the depth sensing device, configure image orientation for components in the depth sensing device or select a depth sensing methodology for components in the depth sensing device.

22. The medium of claim 17, wherein the instructions to determine the mode of operation comprise instructions to:
  configure close-range depth sensing by enabling an infrared (IR) emitter and a first IR sensor in the depth sensing device; and
  configure mid-range depth sensing by also enabling a second IR sensor in the depth sensing device.

23. The medium of claim 22, wherein the instructions to determine the mode of operation comprise instructions to:
  configure long-range depth sensing by disabling the second IR sensor and enabling a third IR sensor, or moving the second IR sensor in the depth sensing device.

* * * * *